United States Patent
Byers

[11] 3,927,942
[45] Dec. 23, 1975

[54] GRAPHICS MODIFIER

[76] Inventor: Thomas L. Byers, 3004 S.E. 21, Del City, Okla. 73115

[22] Filed: July 5, 1974

[21] Appl. No.: 486,146

[52] U.S. Cl. .................. 355/84; 354/125; 355/103
[51] Int. Cl.² ................................. G03B 27/10
[58] Field of Search ............ 355/78, 79, 84, 95, 87, 355/50–52, 40; 354/125

[56] References Cited
UNITED STATES PATENTS

| | | | |
|---|---|---|---|
| 2,139,956 | 12/1938 | Huebner | 354/125 |
| 3,126,809 | 3/1964 | Adams et al. | 355/78 |
| 3,158,077 | 11/1964 | Miller et al. | 355/103 |
| 3,374,724 | 3/1968 | Torres | 355/84 |
| 3,401,616 | 9/1968 | Cross | 355/84 |
| 3,445,165 | 5/1969 | Dubbs | 355/84 |
| 3,449,048 | 6/1969 | Allison | 355/95 X |
| 3,767,301 | 10/1973 | Solo | 355/844 |

Primary Examiner—Richard A. Wintercorn
Attorney, Agent, or Firm—Robert K. Rhea

[57] ABSTRACT

A photographic exposure apparatus for preparing production artwork requiring "drop-out windows" to be photoengraved including a plurality of superposed planar panels supporting a film having at least one symbol thereon in face to face contact with a light sensitive sheet and including means for moving the film supporting panel in a predetermined path during exposure of the light sensitive sheet.

1 Claim, 9 Drawing Figures

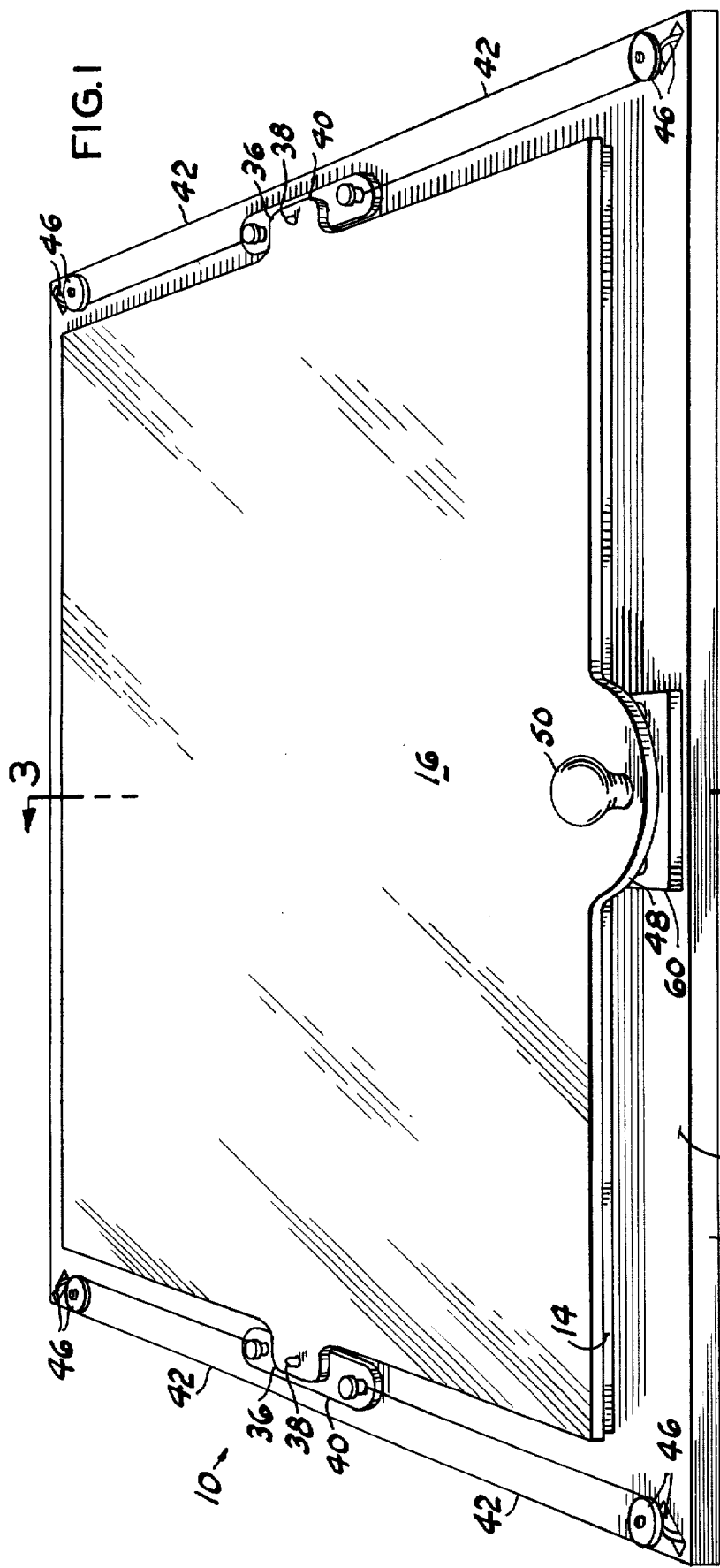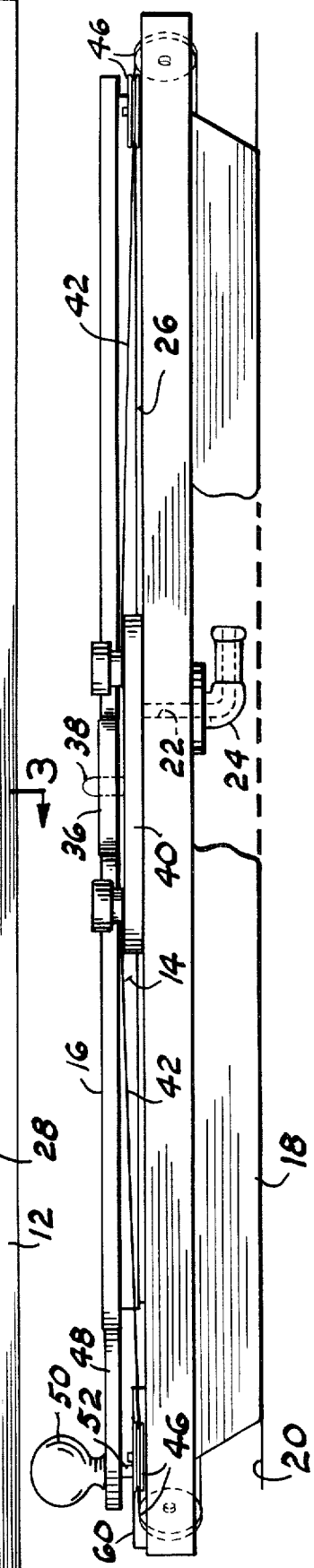

U.S. Patent Dec. 23, 1975 Sheet 2 of 3 3,927,942
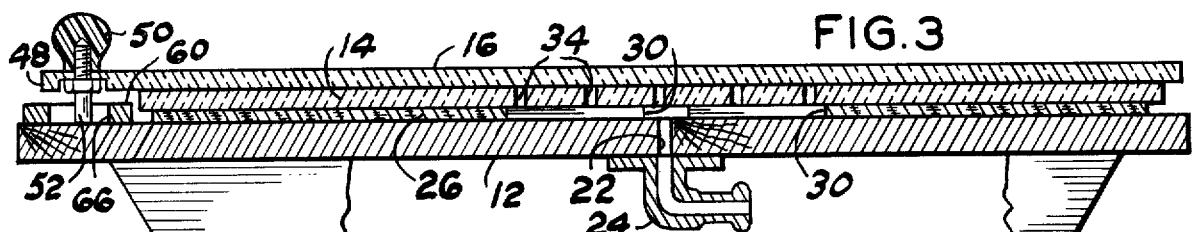
FIG. 3
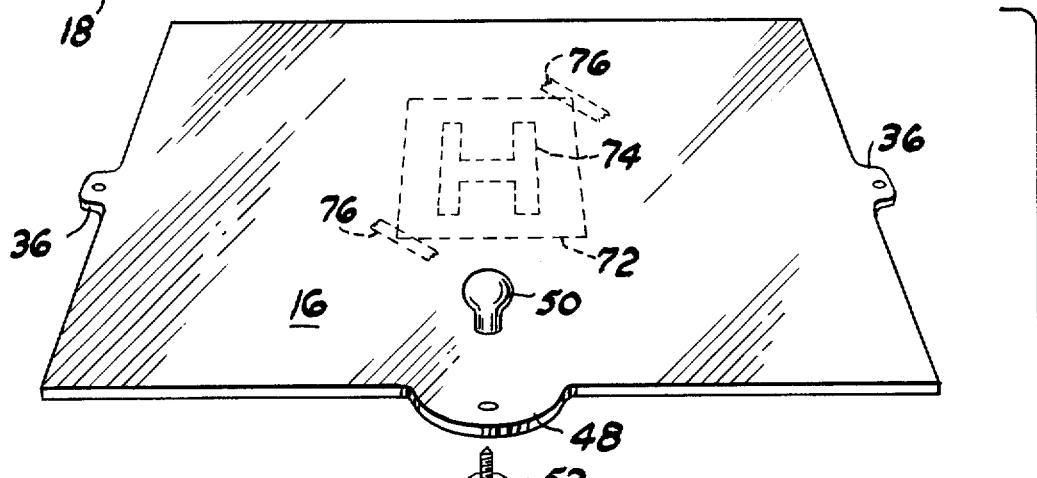
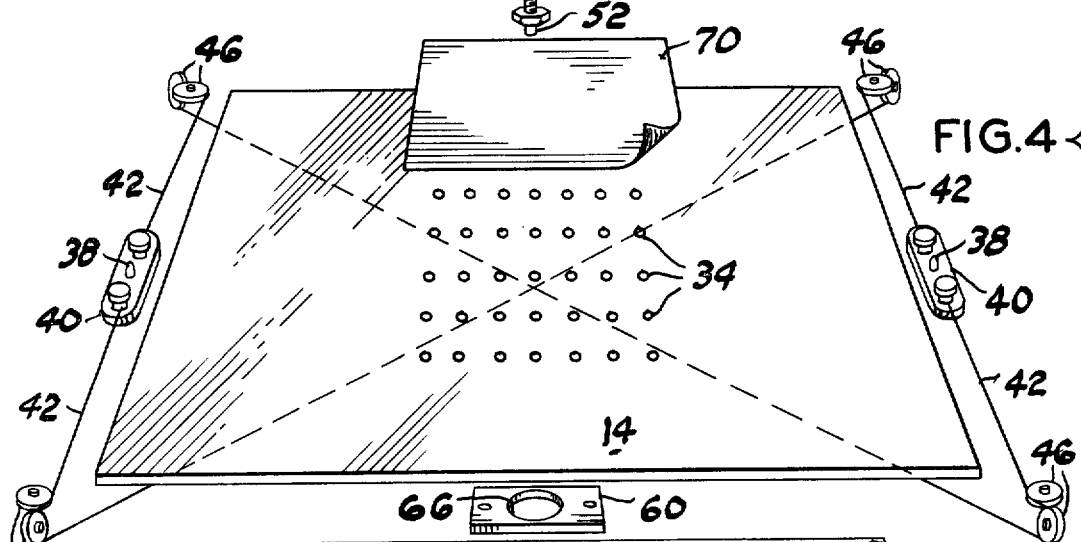
FIG. 4
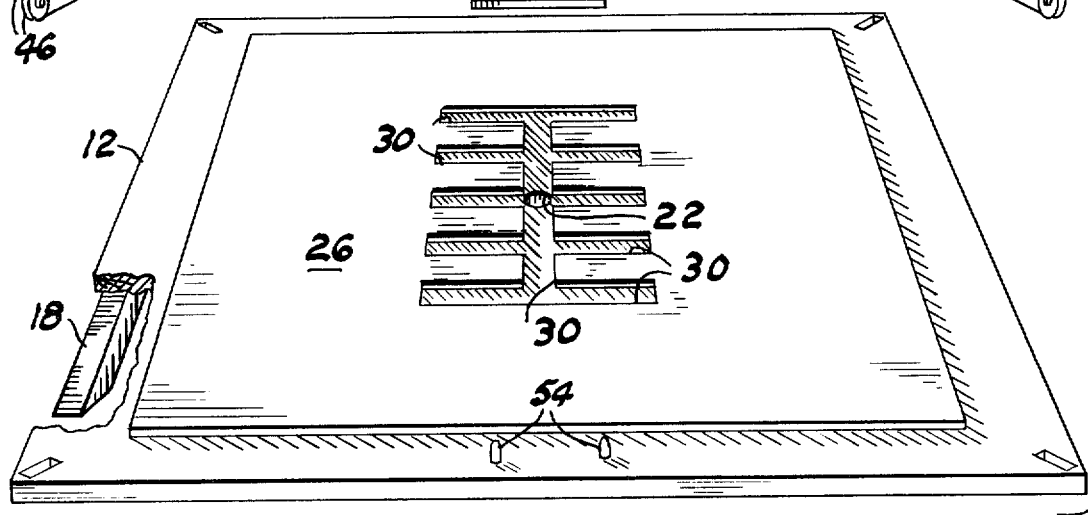

GRAPHICS MODIFIER

BACKGROUND OF THE INVENTION

1. Field of the Invention.

The present invention relates to the preparation of reproducible artwork and more particularly to an apparatus for producing drop-out windows for symbols and the like.

In the graphic arts industry which includes printing, lithographing, duplicating, publishing, advertising and commercial art and photoengraving, finished "camera ready" or production artwork is needed for presentation to the photographic stages of producing a lithographic plate or engraving cut for subsequent printing. The finished camera ready artwork is usually prepared by artists who assemble with precision, the components of the artwork, such as type proofs, illustrations, headlines, photos and film plates, mechanical screens, etc. normally mounted on illustration board as a base with necessary overlay sheets for separating colors or forming colors as may be necessary to produce registerable plates or cuts. One of the problems in preparing such camera ready artwork is preparing "red windows" or opaque panels for dropping out symbols, such as lettering. These red window drop-outs are normally prepared by the use of a sharp instrument cutting a film overlying a transparent sheet with the unwanted film then being pealed off of the transparent sheet for registering the plates formed by the lettering and the red window. It is necessary that the red window be formed so that meeting edges overlap slightly to produce registration of plates or cuts so that meeting edges of the same or different colors are in registration. At best, this is a time consuming and tedious function preparing camera ready artwork. Furthermore, it is frequently desirable to increase the area of the symbol or letters to produce a color outline around the symbol or letter or generate a shadow effect, thus the accuracy of the registration of the plates produced depends upon the skill of the artist in the preparation of the drop out area.

2. Description of the Prior Art.

Prior patents generally disclose apparatus for the registration of photographic plates as disclosed by U.S. Pat. Nos. 1,750,294; 1,859,829 and 2,139,956.

SUMMARY OF THE INVENTION

A generally rectangular planar base is disposed below a point source light. The base is provided with a central aperture communicating with a vacuum source. A slotted sheet gasket overlies the base central opening. A transparent intermediate panel overlies the gasket in fixed relation therewith and is provided with a plurality of rows of apertures in its central portion in registration with the gasket slots. A transparent carriage panel flatly overlies the transparent intermediate panel and is secured at opposing marginal edges to parallel rule-type cable and pulley means supported by the base for movement of the carriage panel with respect to the base while maintaining its marginal edges parallel with the respective marginal edges of the base. A guide template is removably secured to a marginal edge portion of the base template pins and receives a carriage panel guide mandrel within the template opening for limiting the movement of the carriage panel to a predetermined pattern.

A developed film containing an opaque symbol requiring a window is secured to the depending surface of the carriage panel in contact with a photo sensitive sheet held in place by vacuum pull while the carriage panel is moved in a predetermined pattern during light source exposure of the photo sensitive sheet.

The principal object of this invention is to provide an apparatus for photographically generating a drop out pattern for a symbol forming a part of camera ready artwork being prepared.

BRIEF DESCRIPTION OF THE DRAWINGS

FIG. 1 is a perspective view of the device in operative position;

FIG. 2 is a right side elevational view of FIG. 1 with parts broken away for clarity;

FIG. 3 is a vertical cross sectional view taken substantially along the line 3—3 of FIG. 1 with the pulleys and strands omitted for clarity;

FIG. 4 is an exploded perspective view of the components shown in FIG. 1 and including a light sensitive sheet and a developed film secured to the depending surface of the carriage panel, the film being shown by dotted lines;

DESCRIPTION OF THE PREFERRED EMBODIMENT

Figure 5:
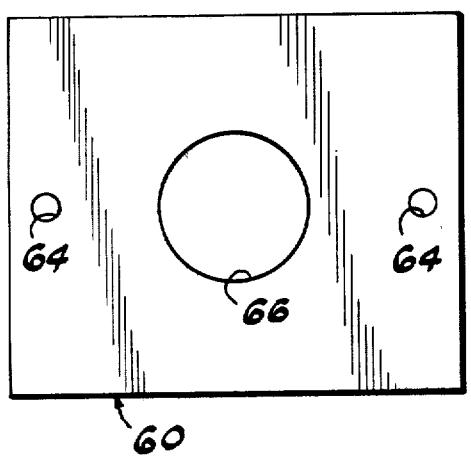
FIGS. 5 and 6 are top plan views, respectively, of two templates used with the device; and, FIGS. 7, 8 and 9 respectively illustrate, by dotted lines end result examples of outline, shadow and shadow outline dropout configurations formed by the letter H.

Like characters of reference designate like parts in those figures of the drawings in which they occur.

In the drawings:

The reference numeral 10 indicates the device, as a whole, which is rectangular planar in overall configuration comprising a base 12, a stationary intermediate preferably transparent panel 14 and a movable transparent top or carriage panel 16. The base 12 is preferably provided with a pair of legs 18 longitudinally secured to its depending surface for supporting the base in spaced relation with respect to the upper surface of a table, or the like, indicated by the line 20. The base is centrally provided with an opening 22 communicating with a tubular fitting 24 in turn connected with a source of vacuum, not shown. A resilient material sheet or gasket 26, of smaller overall dimensions than the base, flatly overlies the upper surface 28 of the base. The gasket 26 is centrally provided with a plurality of intersecting slots 30 communicating with the vacuum opening 22. The overall area, encompassed by the slots 30, is preferably slightly less than the overall dimensions of a photo sensitive sheet to be maintained in place as hereinafter described.

The intermediate preferably transparent panel 14, having overall dimensions at least equal to the overall dimensions of the gasket 26, flatly overlies the gasket and is preferably secured thereto, as by bonding, not shown. The intermediate panel is provided with a plurality of rows of relatively small apertures 34 respectively registering with the gasket grooves 30 for the purposes presently explained.

The carriage panel 16, preferably having overall dimensions slightly greater than the intermediate panel 14 and less than the base 12, flatly overlies the intermediate panel. The carriage panel is provided with opposed laterally extending apertured ears 36 for respectively receiving upstanding pins 38 respectively secured to a pair of links 40. The ends of the links 40 are respectively connected with a pair of cables or strands 42 and 44 respectively entrained through pairs of pulleys 46 journalled by respective corner portions of the base 12 in parallel rule guide fashion permitting to and fro movement of the carriage panel top toward and away from marginal edges of the base while maintaining the marginal edges of the base and carriage panel parallel with each other. The carriage panel is further provided, medially one of its other longitudinal edges, with a coplanar lug 48 having an upstanding control knob or handle 50 secured to a depending guide mandrel 52 projecting through the lug 48 and terminating in close spaced relation with respect to the upper surface 28 of the base 12. The upper surface 28 of the base below the lug 48 is provided with a pair of spaced-apart template receiving pins 54 for receiving carriage panel guide templates, as presently described.

Figure 6:
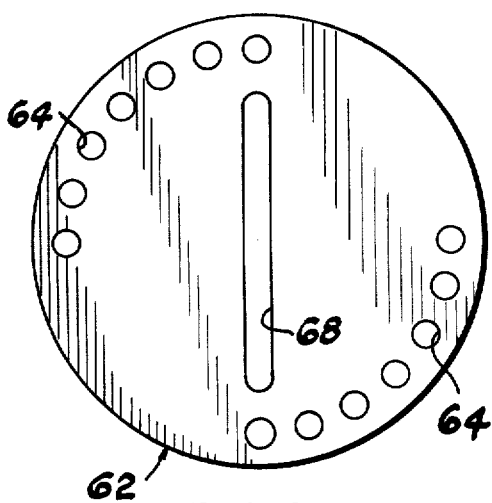
Figure 8:
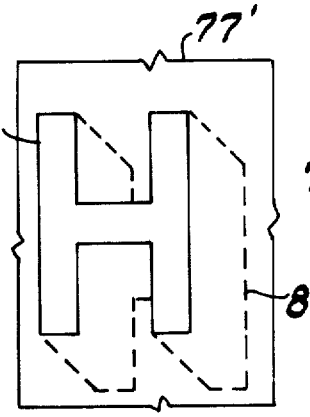

The templates may be rectangular in overall configuration, as illustrated at 60 (FIG. 5), or circular, as at 62 (FIG. 6). The templates are each provided, in opposing marginal edge portions, with an aperture 64 for respectively receiving the template pins 54. The central portion of the respective template is provided with an opening 66 of predetermined configuration such as circular, as in FIG. 5, or elongated, as at 68 (FIG. 8). The configuration of the central opening of the templates is formed in accordance with the desired pattern or movement in selected directions of the carriage panel 16 which is accomplished by the knob mandrel 52 being manually moved by the knob 50 so that the mandrel follows the contour or surface defining the central opening of the template.

Operation

Figure 7:
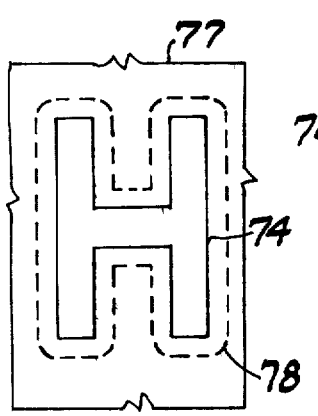
Figure 9:
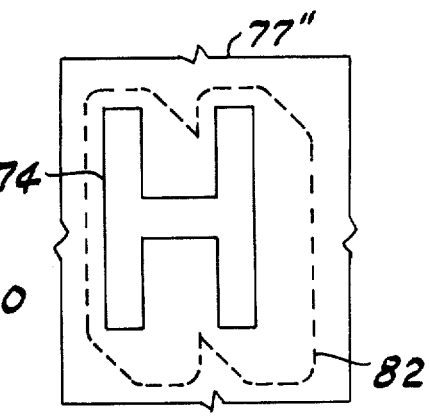

In operation a sheet of light sensitive film 70 (FIG. 4) is placed in overlying relation with respect to the apertures 34 in the intermediate sheet 14. A developed primary film 72, either negative or positive according to the requirements or desired finished artwork containing a desired opaque symbol, for example the letter H indicated at 74 is flatly placed on the depending surface of the carriage panel 16 and held in place, as by transparent tape 76. With the carriage panel secured to the link pins 38 and vacuum pull applied to the base opening 22 to maintain the film 70 in a fixed position relative to the intermediate panel and a selected one of the templates in place on the template pins 54, a point source light, not shown, above the device 10, is turned on and the knob 50 is grasped to move the carriage panel 16 in the pattern defined by the central opening of the selected template. When the selected duration of the exposure of the light sensitive film 70 (usually about 30 seconds) is complete the vacuum source is discontinued and the film developed by conventional photographic processes. The developed secondary film 70 is used by contact photo-printing it with the primary film 72 thus producing a print 77 having an outline pattern for the letter H, as illustrated by the dotted lines 78 (FIG. 7). The dotted lines 80 and 82, on the prints 77' and 77" (FIGS. 8 and 9), respectively illustrate shadow outline and outline-shadow border areas for the letter H similarly formed respectively by the template 62 and a combination of the templates 60 and 62.

Obviously the invention is susceptible to changes or alterations without defeating its practicability, therefore, I do not wish to be confined to the preferred embodiment shown in the drawings and described herein.

I claim:

1. A graphics modifier, comprising:
   a planar base having an upper surface and having an opening in its central portion for communication with a source of vacuum;
   a light sensitive sheet contiguously overlying the opening and a portion of the upper surface of said base for preventing movement of said light sensitive sheet relative to said base;
   at least one stationary panel interposed between said light sensitive sheet and said base,
   said stationary panel having at least one aperture communicating with the opening in said base;
   a transparent carriage panel overlying said base;
   means supported by said base including a plurality of pulleys having strands entrained around the pulleys and connected with said carriage panel permitting movement of said carriage panel relative to said base and maintaining the marginal edges of said carriage panel parallel with respect to adjacent marginal edges of said base;
   a transparent film having at least one opaque symbol thereon interposed between said sensitive sheet and said carriage panel and secured to the latter; and,
   guide means interconnecting with said base and said carriage panel for moving the latter in a predetermined pattern,
     said guide means including upstanding template mounting pins on a marginal portion of the upper surface of said base,
     a template having mounting pin receiving apertures,
     said template having an opening in its central portion defined by inner wall surfaces describing a predetermined configuration,
     a control knob secured to said carriage panel above said template, and,
     a guide mandrel secured to said control knowb and projecting into the opening of said template.

* * * * *